UNITED STATES PATENT OFFICE.

JOSEPH MAXWELL CARRÈRE, OF ALLENTOWN, PENNSYLVANIA, ASSIGNOR TO BLANC STAINLESS CEMENT COMPANY, OF ALLENTOWN, PENNSYLVANIA, A CORPORATION OF NEW JERSEY.

METHOD OF MAKING PORTLAND CEMENT.

932,374.  Specification of Letters Patent.  Patented Aug. 24, 1909.

No Drawing.   Application filed August 27, 1907.   Serial No. 390,413.

*To all whom it may concern:*

Be it known that I, JOSEPH MAXWELL CARRÈRE, a citizen of the United States, residing at Allentown, county of Lehigh, State of Penn sylvania, have invented certain new and useful Improvements in Methods of Making Portland Cement, of which the following is a full, clear, and exact description.

My invention relates to improvements in the manufacture of Portland cement, and has for its object to produce a new and improved process whereby Portland cement of superior quality is produced at a relatively low temperature.

A further object of my invention is to produce Portland cement at such a temperature, which cement shall be white or light in color, and also have the property of not staining the most delicate stone or become discolored itself.

The following is a description of an embodiment of my invention, its subject matter being hereinafter definitely pointed out in the claims.

In practicing my invention in the preferred form, I mix together the following ingredients:—lime in the form of carbonate of lime seventy-three (73) parts, a silicious material in the form of clay or shale twenty-two
(22) parts, and a zinc compound in the form of carbonate of zinc five (5) parts. In order that the cement should be white or light in color, all these ingredients should be free from iron and other impurities, such as sulfur and the like. These ingredients are first thoroughly mixed and ground in the proportions above specified, and are then burned in the ordinary manner heretofore employed in the manufacture of hydraulic or Portland cement. The carbonate of zinc acts as a flux and very greatly reduces the degree of heat necessary to clinker. After the mixture has been subjected to a sufficient degree of heat to clinker, it is then pulverized in the ordi nary manner and is ready for shipment for ordinary uses without the addition of any retarder. If it is desired to make it set still more slowly, a retarder such as sulfate of lime can be added.

Other compounds of zinc may be used in place of carbonate of zinc, such for instance as silicate of zinc, aluminate of zinc or zinc oxid, but in such case due allowance must be made for the difference in the elements combined with the zinc and the proportions would preferably be somewhat different from those above specified. The compounds of zinc above referred to are found in a state of nature as smithsonite ($ZnCO_3$), calomine ($Zn_2SiO_4 + H_2O$), gahnite ($Zn [AlO_2]_2$), and zincite ($ZnO$).

The proportions in the mixture above named have been found by me to produce satisfactory results. The mixture fuses at a much lower degree of heat than has heretofore been necessary in connection with the commercial manufacture of Portland cement, and produces a product which, when hardened, is practically white, and moreover does not change in color and does not stain or discolor stone, brick, or similar materials with which it is brought in contact.

By reason of the use of a zinc compound as a flux, I am enabled to substitute for the clay ordinarily used in the manufacture of Portland cement, substantially pure silica as found in various forms, for instance, sand, sandstone or decomposed sandstone. When silica is used, I prefer to use the following proportions:—carbonate of lime seventy-seven (77) parts, silica eighteen (18) parts, carbonate of zinc five (5) parts. This mixture is then burned as above described and the clinker produced thereby pulverized. This makes a particularly high grade cement, being practically colorless and stainless. When silica is substituted for clay, satisfactory results can also be obtained when the other zinc compounds above referred to are substituted for carbonate of zinc.

In giving the proportions of lime and clay, or shale, above referred to, I have based the same on substantially pure carbonate of lime, and pure clay or shale. Limestones and clays or shales vary in proportions of the carbonate of lime and silica that each contains, and with differing limestones and clays the proportions I have named for the mix would have to be varied accordingly to obtain in the mix the correct proportions of lime and silica for the best cement. The limestone which I use is obtained from the Annville, Pennsylvania, regions and contains about ninety-seven (97) or ninety-eight (98) per cent. of carbonate of lime. The clay is obtained from Minesite, Pennsylvania, and contains about seventy-five (75) per cent. of silica and less than two (2) per cent. of carbonate of lime.

What I claim is:

1. The improvement in the process of manufacturing Portland cement, which consists in mixing with lime and a silicious material, a zinc compound and then burning the mixture and pulverizing the clinker.

2. The improvement in the process of manufacturing Portland cement, which consists in mixing with lime and a silicious material, a salt of zinc, and then burning the mixture and pulverizing the clinker produced thereby.

3. The improvement in the process of manufacturing Portland cement, which consists in mixing with lime and a silicious material, carbonate of zinc, burning the same and then pulverizing the clinker produced thereby.

4. The improvement in the process of manufacturing Portland cement, which consists in producing a mixture of carbonate of lime, a silicious material, and carbonate of zinc, burning the same and pulverizing the clinker produced thereby.

5. The improvement in the process of making a white, stainless cement, which consists in forming a mixture of carbonate of lime, a silicious material and a salt of zinc, all being free from iron, burning the same and pulverizing the clinker produced thereby.

6. The improvement in the process of manufacturing Portland cement, which consists in producing a mixture of carbonate of lime, substantially pure silica, and a zinc compound, burning the same and pulverizing the clinker produced thereby.

7. The improvement in the process of manufacturing Portland cement, which consists in producing a mixture of carbonate of lime, substantially pure silica, and carbonate of zinc, burning the same and pulverizing the clinker produced thereby.

8. The improvement in the process of manufacturing Portland cement, which consists in mixing a quantity of lime with a smaller quantity of silicious material, and a still smaller quantity of a zinc compound, burning the mixture, and pulverizing the clinker produced thereby.

JOSEPH MAXWELL CARRÈRE.

Witnesses:
H. B. BROWNELL,
LANGDON MOORE